United States Patent [19]
Kesinger et al.

[11] Patent Number: 5,443,232
[45] Date of Patent: Aug. 22, 1995

[54] APPARATUS FOR HANGING TV CABLE AND THE LIKE

[76] Inventors: Donald A. Kesinger, 8026 S. Deer Creek Canyon Dr., Morrison, Colo. 80465; Eric S. Kesinger, 2466 S. Fig Ct., Lakewood, Colo. 80228

[21] Appl. No.: 64,985

[22] Filed: May 24, 1993

[51] Int. Cl.6 ............................................. F16M 13/00
[52] U.S. Cl. .................................. 248/62; 248/68.1; 248/900
[58] Field of Search .................... 248/62, 61, 69, 68.1, 248/72, 58, 229, 909, 906, 900, 916, 548, 56, 52; 174/48, 146, 152 G; 24/115 R

[56] References Cited

U.S. PATENT DOCUMENTS

| | | | |
|---|---|---|---|
| 1,315,225 | 9/1919 | Hughes | 248/68.1 |
| 1,333,420 | 3/1920 | Iles | 248/68.1 X |
| 1,846,345 | 2/1932 | McCarten | 248/229 X |
| 2,355,742 | 8/1944 | Morehouse | 248/68.1 |
| 2,683,578 | 7/1954 | Rainey | 248/68.1 |
| 2,876,027 | 3/1959 | Sulmonetti | 248/229 X |
| 3,385,545 | 5/1968 | Patton | 248/68.1 |
| 3,458,163 | 7/1969 | Egerton-Smith | 248/68.1 X |
| 3,747,166 | 7/1973 | Eross | 248/224 X |
| 4,059,321 | 11/1977 | Rasmussen et al. | 174/48 X |
| 4,259,542 | 3/1981 | Tehan et al. | 248/56 X |
| 4,715,571 | 12/1987 | Soltow et al. | 248/69 X |
| 4,819,897 | 4/1989 | Gooding | 248/68.1 |
| 4,967,990 | 11/1990 | Rinderer | 248/906 X |

Primary Examiner—Karen J. Chotkowski
Attorney, Agent, or Firm—Edwin H. Crabtree; Donald W. Margolis

[57] ABSTRACT

An apparatus for hanging one or more cables such as a coaxial cable and the like from a support bracket. The support bracket having a first clamp and a second clamp. The first clamp of the support bracket is attached to a suspension structure such as a pole, pipe, building structure, etc. The method for hanging the cable comprising the inserting of a portion of the cable inside a plastic removable and reusable guide sleeve. The guide sleeve placed inside the second clamp of the support bracket. Also, a guide roller may be used instead of the guide sleeve with the guide roller attached to the second clamp with the cable supported on the roller. The cable is than stretch to a desired tension and the guide sleeve or guide roller is removed from the second clamp and the cable. A rubber grommet is placed around a portion of the cable and the grommet and cable are inserted inside the second clamp of the support bracket. The second clamp is than tightened around the grommet with the cable secured thereon. The rubber grommet includes at least one hole therein. Any additional holes in the grommet includes hole plugs which are removable when placing a portion of the cable therein. The hole plugs support the internal structure of the grommet and prevent the grommet from collapsing. The first clamp is pivotally attached to the second clamp wherein the cable received through the second clamp is held at an angle to an axis through the center of the first clamp.

11 Claims, 1 Drawing Sheet

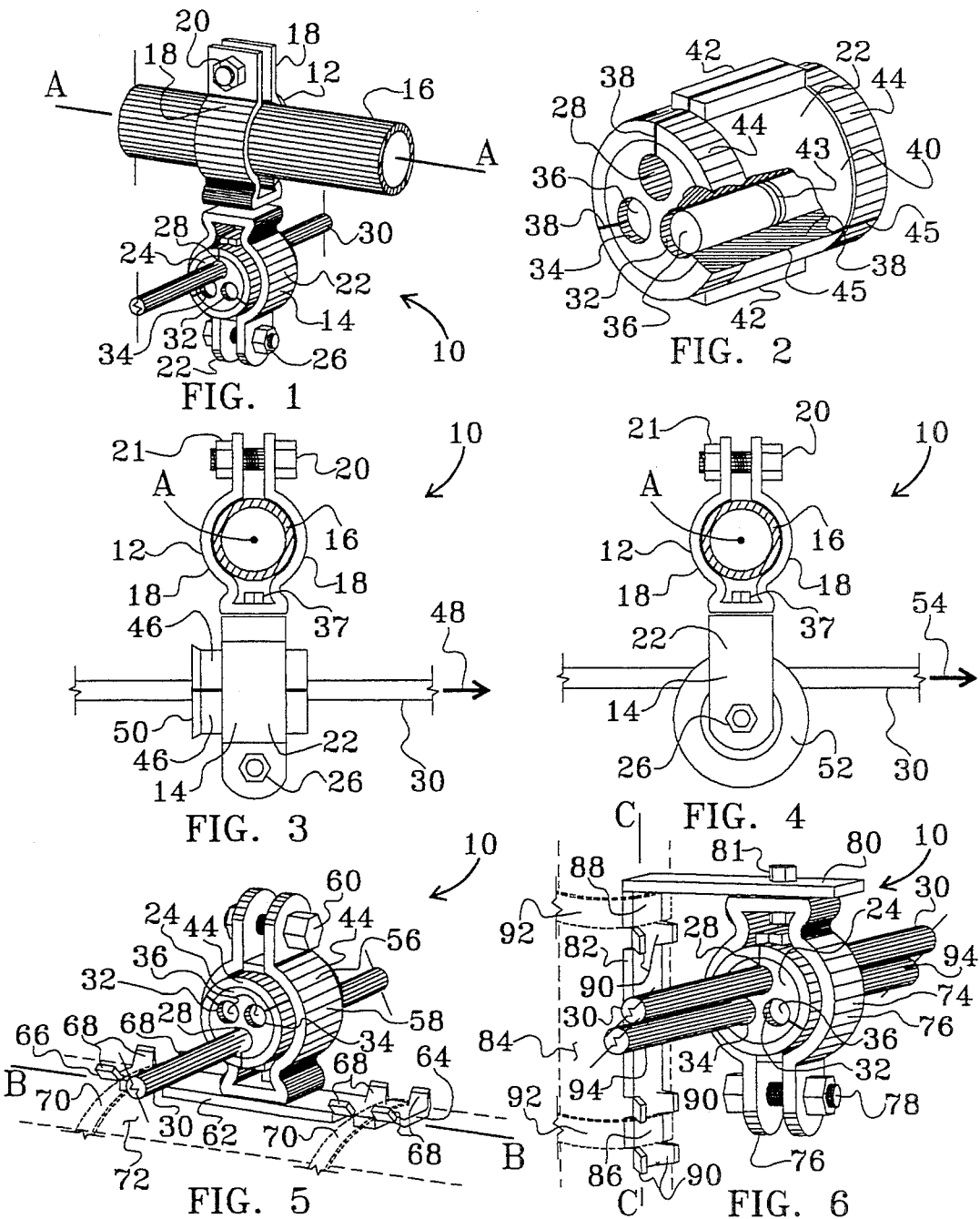

ental cable supports having split grommets or bushings are shown for holding a portion of a cable. These two patents do not show a grommet with a plurality of holes wherein each hole has an individual slit used for inserting a portion of the cable inside the hole. Also, these patents do not disclose cable holes with hole plugs that are integrally molded in place and removable. The hole plugs are used to prevent the grommet from collapsing if the holes are not used for receiving a portion of the cable therein.

APPARATUS FOR HANGING TV CABLE AND THE LIKE

BACKGROUND OF INVENTION (a) Field of the Invention

This invention relates to an apparatus for hanging one or more cables from a suspension structure and more particularly, but not by way of limitation, to a support bracket having a rubber grommet for holding coaxial cable and the like.

(b) Discussion of Prior Art

Heretofore there have been a variety of different types of supports for holding electrical cable. In U.S. Pat. No. 2,470,840 to Hain and U.S. Pat. No. 2,515,603 to Kaplan, electrical cable supports having split grommets or bushings are shown for holding a portion of a cable. These two patents do not show a grommet with a plurality of holes wherein each hole has an individual slit used for inserting a portion of the cable inside the hole. Also, these patents do not disclose cable holes with hole plugs that are integrally molded in place and removable. The hole plugs are used to prevent the grommet from collapsing if the holes are not used for receiving a portion of the cable therein.

In U.S. Pat. Nos. 809,993 to Sorg, 1,164,613 to Jewell, 1,725,120 to Williams, 1,832,996 to Percival et al. and 4,973,259 different types of clamps or brackets are described for holding cable or wire and suspended from another parallel cable or conduit. None of the above mentioned patents disclose the unique features, structure and function of the subject apparatus and method of hanging one or more cables such as coaxial cable and the like from a support bracket.

SUMMARY OF THE INVENTION

In view of the foregoing, it is an object of the present invention to provide an improved and better method of suspending coaxial cable and the like from a suspension structure such as a pole, a pipe, a building structure and other means of suspension.

Another object of the invention is to provide a cable support bracket having a rubber grommet for holding one or more cables therein. The grommet is designed to prevent the cable from slipping back and forth on the support bracket after proper tension is applied to the cable during installation.

Yet another object of the invention is the rubber grommet may include more than one cable hole with hole plugs that are molded in place and removable. The hole plugs are used to prevent the grommet from collapsing if the holes are not used for receiving a portion of the cable therein.

Still another object of the method and apparatus for hanging one or more cables is the support bracket can be attached to a suspension structure vertically, horizontally or at angle to an axis of the suspension structure. The support bracket and grommet can be used with copper and fiber optic coaxial cable along with different types and sizes of electrical cable, wiring and the like.

A further object of the invention is the support bracket and grommet are rugged in construction, inexpensive and easily adapted for holding different size cable diameters.

The apparatus for hanging one or more cables includes a support bracket. The support bracket includes a first clamp and a second clamp. The first clamp of the support bracket is attached to a suspension structure such as a pole, pipe, building structure, etc. A rubber grommet used for holding one or more cables is received inside the second clamp of the support bracket. The second clamp is then tightened around the grommet with the cable or cables secured thereon. The rubber grommet includes at least one hole therein. Any additional holes in the grommet includes hole plugs which are removable when placing a portion of the cable therein. The hole plugs support the internal structure of the grommet and prevent the grommet from collapsing. The first clamp is pivotly attached to the second clamp wherein the cable received through the second clap is held at an angle to an axis through the center of the first clamp.

These and other objects of the present invention will become apparent to those familiar with cable supports, cable brackets, grommets for holding cables and methods used in supporting different types of cables and wiring when reviewing the following description, showing novel construction, combination, and elements as described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a perspective view of the subject invention attached to a horizontal pole or pipe and holding a single cable at an angle to an axis A—A through the pole or pipe FIG. 2 is a perspective view of a rubber grommet having a first hole for receiving a portion of a cable therethrough and second and third hole with hole plugs held therein.

FIG. 3 is a side view of the cable bracket with a first clamp attached to a pipe or pole and a second clamp having a plastic removable guide sleeve for stringing cable through the guide sleeve and prior to applying tension on the cable.

FIG. 4 is a side view of the cable bracket similar to FIG. 3 with the second clamp having a guide roller rather than the removable guide sleeve.

FIG. 5 is a perspective view of horizontal cable bracket with rubber grommet for holding a cable on a horizontal suspension structure having an axis B—B.

FIG. 6 is a perspective view of a vertical cable bracket with rubber grommet for holding a cable on a vertical suspension structure having an axis C—C.

DESCRIPTION OF THE PREFERRED EMBODIMENTS

In FIG. 1, a perspective view of the subject invention is shown wherein the cable support bracket used for hanging one or more cables is designated by general reference numeral 10. The support bracket 10 includes a first clamp 12 pivotly mounted on a second clamp 14. The first clamp 12, shown in this drawing, is received around a portion of a horizontal pipe 16. The pipe 16 having an axis A—A therethrough. While pipe 16 is shown it can be appreciated that a pole or like structure can be used equally well for mounting the bracket 10 thereon. The clamp 12 includes a pair of clamp arms 18 which are received around the pipe 16 and secured together using a threaded bolt 20 and nut 21. The nut 21 is shown in FIGS. 3 and 4.

The second clamp 14 includes a pair of clamp arms 22 received around a rubber grommet 24. The clamp arms 22 are secured together using a threaded bolt 26 and nut. The second clamp nut is not shown in the drawings. The rubber grommet 24 has a first hole 28 therethrough for receiving a portion of a coaxial cable 30. The rubber grommet 24 also includes a second hole 32 and third hole 34 for receiving other parallel cables 30 therethrough. The second hole 32 and third hole 34 include hole plugs 36 which are integrally molded inside the holes 32 and 34. The plugs 36 prevent the grommet 24 from collapsing when the bracket 10 is installed and in use. When additional cable 30 is installed in the grommet 24, the hole plugs 36 are removed.

Also shown in FIG. 1 is the cable 30 suspended from the pipe 16 and at a right angle to an axis A—A through the center of the pipe 16. The second clamp 14 is pivotly mounted on the first clamp 12 using a threaded bolt 37 shown in FIGS. 3 and 4 so that the suspended cable 30 can be held at right angles to the pipe 16 or any other angle to the axis A—A of the pipe 16.

In FIG. 2 a perspective view of the rubber grommet 24 is shown removed from the second clamp 14 and ready for receipt around a portion of the cable 30. The grommet 24 includes hole slits 38 cut into the an outer periphery 40 of the grommet 24 inwardly to each hole. The slits 38 allow the pliable rubber grommet 24 to be spread apart sufficiently for receiving a portion of the cable 30 therethrough and into each of the holes. When the second and third holes 32 and 34 are used, the plugs 36 are first removed and than the cable 30 is inserted through the spread apart slits 38 into the holes. The grommet 24 may be made of different types of rubber or soft flexible pliable material wherein the sides of each hole in grommet 24 has a sufficiently high coefficient of friction to grip the sides of the cable 30 and hold the cable 30 in place on the bracket 10. This feature is important to prevent the cable 30 from moving or sliding back and forth on the bracket 10 due to a wind, a storm and other weather conditions and allowing the cable 30 to droop excessively downward on one side of the bracket 10 and have little or no cable droop on the other side of the bracket 10.

The grommet 24 also includes stops 42 on the top and bottom of the grommet 24 to prevent it from turning inside the clamp arms 22 after the arms 22 are tightened. The stops 42 fill in the void between the two clamp arms 22 and provide for proper indexing of the grommet 24 inside the second clamp 14 when installing the support bracket 10. Further, the grommet 24 includes outwardly extending flanges 44 on opposite sides of the grommet 24. The clamp arms 22 are received and tightened around the circumference of the grommet 24 and between the flanges The flanges 44 prevent the grommet 24, when the cable 30 is mounted thereon, from working free and slipping outwardly from the sides of the clamp arms 22.

Also shown in FIG. 2 is a portion of the grommet 24 cut away adjacent the second hole 36. As mentioned above, the hole plug 36 is integrally formed in the holes 32 and 34. The hole plug 36 is secured to the sides of each hole 32 and 34 by a connecting rib 43. In removing the hole plug 36, lips 45 on opposite sides of the hole slit 38 are spread apart and the hole plug 36 is torn free from the connecting rib 43. The hole 36 is now free for inserting a portion of the cable 30 therein.

In FIG. 3 a side view of the support bracket 10 is shown wherein the method of hanging the cable 30 from the support bracket 10 is described. In this view, a portion of the cable 30 is received inside a split plastic removable and reusable guide sleeve 46. The cable 30 and guide sleeve 46 are inserted into the second clamp 14 and the cable 30 is pulled, as indicated by arrow 48, to a proper tension. The sleeve 46 includes a flange 50 around one side thereof to prevent the sleeve 46 from being pulled free from the second clamp 14 when the cable 30 is tightened as shown in FIG. 3. The guide sleeve 46 is than removed from around the cable 30 and the second clamp 14. The grommet 24 is then installed on the cable 30 and inserted into the second clamp 14. The clamp arms 22 are now tightened around the grommet 24 as shown in FIG. 1 with the cable 30 suspended from the bracket 10.

In FIG. 4 the support bracket 10 is shown with a guide roller 52 mounted on the second clamp 14 in place of the split plastic guide sleeve 46 shown in FIG. 3. The guide roller 52 is rotatably mounted on the shaft of the threaded bolt 26 between the two clamp arms 22 of the second clamp 14. One end of the cable 30 is threaded between the clamp arms 22 and received on top of the guide roller 52. The cable 30 is then pulled to a proper tension as indicated by arrow 54. When the tensioning of the cable 30 is complete, the guide roller 52 is removed and the grommet 24 is installed around a portion of the cable 30. The grommet 24 is then inserted between the clamp arms 22. The clamp arms 22 are tightened around the grommet 24 using the threaded bolt 26.

In FIG. 5 a different embodiment of the support bracket 10 is shown wherein a third clamp 56 with clamp arms 58 is attached to the rubber grommet 24 using a threaded bolt 60. The cable 30 is suspended on the grommet 24. The third clamp 56 is pivotally attached to a substantially flat mounting plate 62. The mounting plate 62 includes a first end 64 and a second end 66. The ends 64 and 66 include spaced apart upwardly extending ears 68. The ears 68 are tapered inwardly toward each other so that a metal band 70 or the like is wedged downwardly against the top of the mounting plate 62 when the band 70 is tightened around a support structure 72.

FIG. 5 illustrates a pair of the bands 70 in dotted lines and the support structure 72 also in dotted lines. The support structure 72 in this drawing is shown in a horizonal position and having an axis B—B. It should be appreciated that the support bracket 10 with mounting plate 62 can also be attached to a vertical pole or other support structure and work in a like manner serving the same function as described above in holding the cable 30 at an angle to the axis B—B.

In FIG. 6 still another embodiment of the support bracket 10 is disclosed wherein a fourth clamp 74 having clamp arms 76 is secured to the rubber grommet 24 using a threaded bolt 78. The fourth clamp 74 is pivotly attached to a flat horizontal suspension arm 80 by a threaded bolt 81. The suspension arm 80 is an extension of a vertical mounting plate 82 which is received adjacent a vertical support structure 84. The support structure 84 is shown in dotted lines. The mounting plate 82 is similar to the mounting plate 62 and includes a first end 86 and a second end 88 having tapered ears 90 formed therein for receiving metal bands 92. The metal bands 92 are received between the spaced apart ears 90 and wedged against the top of the mounting plate 82. The metal bands 92 are shown in dotted lines and are secured around the support structure 84.

The support structure 84 in this drawing is shown in a vertical position and having an axis C—C. It should be appreciated that the support bracket 10 with suspension arm 80 can also be attached to a horizontal member or other support structure and work in a similar manner serving the same function as described above in holding the cable 30 at an angle to the axis C—C. The fourth clamp 74 with suspension arm 80 is similar to the third clamp 56 shown in FIG. 5 but is designed to hold cables of greater weight.

In FIG. 6 it should be noted that the hole plug 36 in the third hole 34 has been removed and a second cable 94 is received through the third hole 34 in the grommet 24. The second cable 94 is parallel to the cable 30 and held fast on the rubber grommet 24 secured to the support bracket 10.

The support bracket 10 as described above has shown the clamps 14, 56 and 74 used in conjunction with other clamps arid mounting plates. It can be appreciated that a clamp with the grommet 24 can be attached directly to a horizontal, angled or vertical suspension structure and work equally well with the advantages and objects of the novel cable support bracket 10 as described above.

While the invention has been particularly shown, described and illustrated in detail with reference to the preferred embodiments and modifications t hereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. An apparatus for hanging and gripping the sides of one or more cables such as coaxial cable from a suspension structure, the apparatus comprising:

a support bracket having a first clamp with clamp arms and a second clamp with clamp arms, the clamp arms of said second clamp adapted for attachment to the suspension structure;

a grommet made of flexible pliable material, said grommet having a first hole for receiving a portion of a first cable therein and wherein sides of said first hole have sufficiently high coefficient of friction to grip the sides of said first cable, said grommet received on said first clamp and tightened thereon, said grommet disposed on said first clamp at an angle to an axis of the suspension structure, said grommet includes a second hole with a molded tear out hole plug integrally formed therein and connected to a connecting rib in said second hole, said hole plug extending along a length of said grommet and providing means for preventing the collapse of said grommet prior to removal from said second hole and receipt of a portion of a second cable therein;

index stops on a top and a bottom of a circumference of said grommet, said index stops preventing the turning of said grommet on the clamp arms of said first clamp when said first clamp is tightened on said grommet, said index stops providing for proper indexing of said grommet on said first clamp when installed; and flanges on opposite sides of said grommet and therearound, the clamp arms of said first clamp received between said outwardly extending flanges and tightened around the circumference of said grommet, said flanges preventing said grommet when the cable is mounted therein from working free and slipping outwardly from the sides of the clamp arms.

2. The apparatus as described in claim 1 herein said grommet includes a third hole with a molded tear out hole plug integrally formed therein and connected to a connecting rib in said third hole, said hole plug extending along a length of said grommet and providing means for preventing the collapse of said grommet prior to removal from said third hole and receipt of a portion of a third cable therein.

3. The apparatus as described in claim 1 wherein said second hole includes a second hole slit cut into an outer periphery of said grommet inwardly to said second hole, said second hole slit allowing said grommet to be spread apart sufficiently for receiving a portion of a second cable therethrough and into said second hole.

4. The apparatus as described in claim 2 wherein said third hole includes a third hole slit cut into an outer periphery of said grommet inwardly to said third hole, said third hole slit allowing said grommet to be spread apart sufficiently for receiving a portion of a third cable therethrough and into said third hole.

5. An apparatus for hanging and gripping the sides of one or more cables such as coaxial cable from a suspension structure, the apparatus comprising:

a support bracket having a first clamp with a pair of clamp arms and a second clamp with a pair of clamp arms, said second clamp with clamp arms adapted for receipt around a portion of the suspension structure;

a grommet, said grommet having a first hole for receiving a portion of a first cable therein and wherein sides of said first hole have sufficiently high coefficient of friction to grip the sides of said first cable, the clamp arms of said first clamp received around said grommet and tightened thereon, said grommet having a second hole with hole support means therein and extending along a length of said grommet, said hole support means for preventing the collapse of said grommet prior to removal from said second hole and receipt of a portion of a second cable therein.

6. The apparatus as described in claim 5 wherein said grommet includes a third hole with hole support means therein and extending along a length of said grommet, said hole support means for preventing the collapse of said grommet prior to removal from said third hole and receipt of a portion of a third cable therein.

7. The apparatus as described in claim 5 wherein said grommet includes a second hole slit cut into an outer periphery of said grommet inwardly to said second hole, said second hole slit allowing said grommet to be spread apart sufficiently for receiving a portion of a second cable therethrough and into said second hole.

8. The apparatus as described in claim 6 wherein said grommet includes a third hole slit cut into an outer periphery of said grommet inwardly to said third hole, said third hole slit allowing said grommet to be spread apart sufficiently for receiving a portion of a third cable therethrough and into said third hole.

9. The apparatus as described in claim 5 wherein said grommet includes index stops on a circumference of said grommet, said index stops preventing the turning of said grommet on the clamp arms of said first clamp when said first clamp is tightened on said grommet, said index stops providing for proper indexing of said grommet on said first clamp when installed.

10. The apparatus as described in claim 5 wherein said grommet includes outwardly extending flanges on opposite sides of said grommet and therearound, the clamp arms of said first clamp received between said outwardly extending flanges and tightened around a circumference of said grommet, said flanges preventing said grommet when the cable is mounted therein from working free and slipping outwardly from the sides of the clamp arms.

11. An apparatus for hanging and gripping the sides of one or more cables such as coaxial cable from a suspension structure, the apparatus comprising:

a support bracket having a first clamp with a pair of clamp arms and a second clamp with a pair of clamp arms, said second clamp with clamp arms adapted for receipt around a portion of the suspension structure;

a grommet, said grommet having a first hole for receiving a portion of a first cable therein, the clamp arms of said first clamp received around said grommet and tightened thereon, said grommet having a second hole with a molded tear out hole plug integrally formed therein and connected to a connecting rib in said second hole, said hole plug extending along a length of said grommet and providing means for preventing the collapse of said grommet prior to removal from said second hole and receipt of a portion of a second cable therein, said grommet having a third hole with a molded tear out hole plug integrally formed therein and connected to a connecting rib in said third hole, said hole plug extending along a length of said grommet and providing means for preventing the collapse of said grommet prior to removal from said third hole and receipt of a portion of a third cable therein, said grommet held on said first clamp at a right angle to an axis of the suspension structure;

a first hole slit cut into an outer periphery of said grommet inwardly to said first hole, said first hole slit allowing said grommet to be spread apart sufficiently for receiving a portion of the cable therethrough and into said first hole;

a second hole slit cut into an outer periphery of said grommet inwardly to said second hole, said second hole slit allowing said grommet to be spread apart sufficiently for receiving a portion of a second cable therethrough and into said second hole;

a third hole slit cut into an outer periphery of said grommet inwardly to said third hole, said third hole slit allowing said grommet to be spread apart sufficiently for receiving a portion of a third cable therethrough and into said third hole;

index stops disposed on the top and bottom of a circumference of said grommet, said index stops preventing the turning of said grommet on the clamp arms of said first clamp when said first clamp is tightened on said grommet, said index stops providing for proper indexing of said grommet on said first clamp when installed; and outwardly extending flanges on opposite sides of said grommet and therearound, the clamp arms of said first clamp received between said outwardly extending flanges and tightened around a circumference of said grommet, said flanges preventing said grommet when the cable is mounted therein from working free and slipping outwardly from the sides of the clamp arms.

* * * * *